United States Patent [19]

Noonan

[11] 4,235,837

[45] Nov. 25, 1980

[54] METHOD OF MAKING ORIENTED CONTAINERS

[75] Inventor: Robert P. Noonan, Naperville, Ill.

[73] Assignee: Standard Oil Company (Indiana), Chicago, Ill.

[21] Appl. No.: 627,695

[22] Filed: Oct. 31, 1975

Related U.S. Application Data

[63] Continuation-in-part of Ser. No. 519,639, Oct. 31, 1974, abandoned.

[51] Int. Cl.$^3$ .............................................. B29C 17/07
[52] U.S. Cl. ................................... 264/520; 264/521; 264/530; 425/526; 425/530
[58] Field of Search ...................... 264/89, 90, 92, 94, 264/96, 99, 296, 520, 521, 530, 537, 538, 539; 425/DIG. 215, DIG. 208, 526, 530

[56] References Cited

U.S. PATENT DOCUMENTS

| | | | |
|---|---|---|---|
| 2,715,751 | 8/1955 | Weber | 264/97 X |
| 3,244,778 | 4/1966 | Ninneman | 264/97 X |
| 3,733,309 | 5/1973 | Wyeth et al. | 264/98 X |
| 3,776,991 | 12/1973 | Marcus | 264/89 |
| 3,822,332 | 7/1974 | Hrach et al. | 264/97 |
| 3,963,399 | 6/1976 | Zavasnik | 425/526 |
| 3,966,378 | 6/1976 | Valyi | 264/94 X |
| 4,061,705 | 12/1977 | Marcus | 264/530 X |

FOREIGN PATENT DOCUMENTS 2220363 10/1974 France.

Primary Examiner—Jan H. Silbaugh
Attorney, Agent, or Firm—William H. Magidson; William T. McClain; Ralph C. Medhurst

[57] ABSTRACT

Production of oriented polyethylene terephthalate containers by injecting a polyethylene terephthalate composition into a first mold chamber defining a parison having an axis substantially defined by a core rod and perimeter defined by the wall of the mold; cooling the exterior wall of the polyethylene terephthalate parison to render the outer wall of the parison dimensionally stable; after the outer wall of the parison is dimensionally stable, transferring the parison, while disposed on the core rod, to a second mold chamber having on an average a tolerance of between 2.5 and 150% between the body of the parison and the wall of the second mold chamber; when the core rod is at no more than 265° F., injecting a gaseous fluid into the parison at a pressure of at least 10 psig to separate the body of the parison from the core rod and force the exterior wall of the body of the parison to assume the shape of the wall of the second chamber; transferring the parison, while the neck of the parison is disposed on the core rod, to a third chamber having on an average a tolerance of at least 50% between the body of the parison and the wall of the third chamber; and at the orientation temperature of the polyethylene terephthalate parison, injecting a gaseous fluid into the parison to force the exterior walls of the body of the parison to assume the shape of the wall of the third chamber and to orient the walls of the body of parison.

4 Claims, No Drawings

METHOD OF MAKING ORIENTED CONTAINERS

This application is a continuation-in-part of application Ser. No. 519,639, filed Oct. 31, 1974, now abandoned.

This invention relates to the production of oriented polyethylene terephthalate plastic bottles.

Over the last 20 years, plastic containers have replaced glass containers in many uses. More recently, there has been considerable interest in the production of oriented plastic containers, such as those based on polyethylene terephthalate, since the oriented containers have much better physical properties and/or barrier properties than unoriented containers. As is well known, oriented plastic containers can be produced by stretching the walls of a polymeric parison only at or below orientation temperature of the particular plastic. Stretching or blowing above the orientation temperature results in no orientation and accordingly, no increase in physical properties, etc. These processes are complicated by the fact that the orientation temperatures of polymeric materials can be substantially below the melting points of the polymers used to produce the polymeric parison, the fact that the walls of the parison must be at a relatively uniform temperature during orientation and the need for rapid production of bottles on an assembly line basis.

Two general techniques have been developed for producing oriented containers. The first type comprises forming a pre-formed tubular parison, cooling the parison to room temperature, possibly storing the parison for a period of time, and subsequently heating and blowing the pre-formed parison, while disposed in a blow mold, into the desired shape. The second type, called injection blow molding, comprises injection molding or extruding a hot parison, cooling the hot parison to a suitable orientation temperature and then blowing the partially cooled parison, while disposed in a blow mold. The former type of processing permits rapid production of parisons but results in wasting a substantial portion of polymeric material and is also subject to various other disadvantages. The second type, is subject to the time and temperature problems in cooling the pre-formed parison to the orientation temperature in a short period of time. Polymers such as polyethylene terephthalate, which must be oriented at a temperature more than 200° F. less than their melting points, present severe time problems.

The general object of this invention is to provide an improved method of producing oriented polyethylene terephthalate containers. A more specific object of this invention is to provide a relatively rapid method of injection blow molding oriented polyethylene terephthalate bottles. Other objects appear hereinafter.

For the purpose of this invention, a parison can be viewed as having three distinct zones, namely the "tip" portion, which corresponds to the bottom of the final container; the "neck" portion, which is substantially the same size in the parison and final container and, the "body" portion, which corresponds to the hoop portion of the container.

I have now found that the objectives of this invention can be attained by a multi-step process which comprises:

1. injecting polyethylene terephthalate into a first mold chamber or zone defining a parison having an axis substantially defined by a core rod and perimeter defined by the wall of the mold;

2. cooling the exterior wall of the polyethylene terephthalate parison to render the outer wall of the parison dimensionally stable;

3. after the outer wall of the parison is dimensionally stable, transferring the parison, while disposed on the core rod, to a second mold chamber having an average tolerance of between 2.5 and 150% between the body of the parison and the wall of the second mold chamber, wherein the wall of the second chamber is preferably at a higher temperature than the wall of the first chamber in contact with the parison tip;

4. when the core rod is at no more than 265° F., injecting a gaseous fluid into the parison at a pressure of at least 10 psig to separate the body of the parison from the core rod and force the exterior wall of the body of the parison to assume the shape of the wall of the second chamber;

5. transferring the parison, while the neck of the parison is disposed on the core rod, to a third chamber having a gap of at least 50% between the body of the parison and the wall of the third chamber; and 6. at the orentation temperature of the polyethylene terephthalate parison, injecting a gaseous fluid into the parison to force the exterior walls of the body of the parison to assume the shape of the wall of the third chamber and to orient the walls of the body of parison.

For convenience, it is desirable to consider the importance of the various steps in this invention with reference to the production of a polyethylene terephthalate container having a cylindrical body suitable for use in bottling carbonated beverages, such as pop or beer. In somewhat greater detail the process entails injecting polyethylene terephthalate at about 520° to 590° F. into a test tube shaped first mold chamber or zone defined by a core rod and the chamber walls. Above about 590° F., the polyethylene terephthalate degrades. The principle function of the core rod is to define the inner wall of the parison and to serve as a support for transferring the parison from station to station. Preferably the core rod has cooling means to aid in the rapid cooling of the parison in the first mold and usually contains a conduit for injecting gaseous fluid to expand the parison in the second and third chambers.

The walls of the first chamber define the outside dimensions or perimeter of the parison with the gap between the core rod and first chamber walls controlling the thickness of the parison. Generally, the walls of the parison can range from about 15 to 400 mils on an average. In order to produce a test tube shaped or closed end parison, there is also a gap between the tip or bottom of the core rod and the chamber bottom. The first chamber contains cooling means to obtain rapid cooling of the parison outer walls. Typically the walls of the chamber in close proximity to the closed end or tip of the parison are maintained at a substantially lower temperataure than the walls of the chamber in contact with the body or top of the parison since there is usually a greater mass of polymer to be cooled at the tip or closed end.

The parison is mantained in the first chamber until the exterior walls of the polyethylene terephthalate parison are dimensionally stable and the parison can be transferred to a second chamber without changing the parison configuration. Normally, the parison being transferred has a substantial temperature gradient throughout its mass with the dimensionally stable outer wall of the parison being substantially cooler than the rest of the polyethylene terephthalate parison. In effect the parison may be viewed as having a relatively cool skin or shell containing the hotter polyethylene terephthalate. Of course, the parison cannot be oriented effectively while there is this large temperature gradient. However, forming this relatively cool skin or shell while the parison is partially supported by the core rod permits a substantial saving in the time necessary to maintain the polymeric material in the injection mold or first chamber and accordingly a reduction in production time.

The second chamber which must be larger in the hoop dimension than the first chamber (except in the neck portion), may be viewed as an equilibration chamber where the temperature gradient throughout the parison is reduced. This chamber is extremely important since it permits relatively rapid equilibration of polyethylene terephthalate parison which must be oriented at a temperature more than 200° F. less than polyethylene terephthalate melting point. This chamber reduces the cycle time by about 25% and increases productivity by about 33%. Temperature equilibration is facilitated by separating the body and tip of the parison from the core rod by injecting a gaseous fluid into the parison at a pressure of at least 10 psig. As pointed out by Ninneman in U.S. Pat. No. 3,244,778, which is incorporated by reference, separation of the parison from contact with a metal surface by injecting air removes the parison from heat transfer relationship with the metal surface. However, unlike Ninneman, his invention requires the injection of gaseous fluid at 10 psig or higher, preferably 40 to 120 psig. If the gaseous fluid is at less than 10 psig or the core rod is above 265° F., polyethylene terephthalate does not separate properly from the core rod. Generally, best results with polyethylene terephthalate are attained with a core rod temperature of 100° to 200° F. Further, the separation of the parison body and tip from the core rod has to be carried out in a chamber where the chamber walls in contact with the parison tip is above the temperature of the tip portion of the walls of the first chamber to obtain maximum orientation. This higher temperature is necessary to raise the skin or shell temperature of the parison to a temperature at which air pressure can expand the parison. If the wall temperature of the parison is too low, the tip portion of the parison will not assume the shape of the second chamber.

The separation or tolerance in the hoop dimension between the parison and the second chamber should on an average range from about 2.5% to 150% of the distance across the body of the parison. In the case of a tubular or test tube shaped parison, the separation between the parison wall and the chamber should be equal to at least 2.5% times the outside diameter of the parison or 5% times the outside radius of the parison. Stated a different way the chamber inside diameter should be 105 to 300% of the outside diameter of the parison. If the tolerance is too small, it is difficult to obtain the desired rapid temperature equilibration of the parison. On the other hand if the tolerance is too large, it is difficult to obtain the desired orientation in the third chamber. The walls of the second chamber can be maintained above or below the orientation temperature of the polyethylene terephthalate parison.

The parison, whose neck portion is still disposed on the core rod, is then transferred to the third chamber to produce an oriented bottle. The separation or tolerance in the hoop dimension between the parison and the third chamber should be on an average at least 50% of the distance across the parison or distance across the second chamber. In the case of a tubular or test tube shaped parison the separation between the parison wall and the third chamber should be equal to at least 50% times the outside diameter of the parison formed in the second chamber or 100% times the outside radius of the parison. Stated a different way the third chamber should have an inside diameter of at least 200% up to about 600% of the outside diameter of the parison. Orientation is accomplished by injecting a gaseous fluid at 40 to 500 psig, preferably 80 to 250 psig at a suitable orientation temperature. As indicated below, the lower the orientation temperature employed, the higher the pressure of gaseous fluid.

The polyethylene terephthalates useful in this invention contain at least 75 mole percent terephthalate units and at least 75 mole percent ethylene glycol units.

While the aforesaid description is directed primarily to the production of monoaxially oriented containers, biaxially oriented containers can be produced advantageously by using a third chamber or mold which is approximately 40% to 600% longer in the axial direction than the second mold chamber. Orientation in the axial direction is also facilitated by using an extendible core rod which can be used to stretch the parison in the third chamber.

The following examples are merely illustrative. In the following examples, the conditions recited in each chamber are repeated for each composition or structure placed in the chamber.

EXAMPLE 1

Ninety-five hundredths I.V. (inherent viscosity) homopolymeric polyethylene terephthalate at 560° F. was injected into the first stage of a Rainville 30 ton 4-station modular injection blow molding machine modified to contain two blow molds and temperature control means in the core rods and walls of the first three modular stations. The core rods were thermostatted at 125° F. In the first mold chamber or injection mold station, the portion of the chamber walls in contact with the top of the parison and the bottom half of the parison body were thermostatted at 42°–46° F. while the portion of the chamber walls in contact with the neck of the parison and upper portion of the parison walls were thermostatted at 160° F. The first chamber had a 0.8″ diameter opening in the hoop direction with from 80 to 140 mil gap between the 4½″ long core rod and chamber walls, the largest gap being toward the bottom of the parison body and tip area. After nine seconds in the first station, the injection mold was opened and the core rod bearing the parison was transferred to the second mold station having a 1″ diameter in the hoop dimension while a fresh charge of polyethylene terephthalate was injected into the vacant first chamber. A gaseous fluid was injected from the core rod in the second station into the parison at 40 psig while the walls of the second chamber were maintained at 185° F. After nine seconds residence time, the first and second mold chambers were opened and the parisons in the first and second stations were advanced to the second and third stations, respectively, while disposed on their core rods and fresh polyethylene terephthalate was injected into the vacant first chamber. A gaseous fluid was injected from the core rod in the third station into the parison at 120 psig to orient the polymer and fill the third chamber, which as 2½" in diameter in the hoop dimension and whose chamber walls were at 42 to 46° F. After nine seconds residence time the molds were opened and the parisons while disposed on their core rods were advanced. The finished bottle leaving the third chamber was ejected at the fourth station.

Eight ounce polyethylene terephthalate bottles produced in the aforesaid manner had the following average properties:

| Property | Hoop | Axial | |
|---|---|---|---|
| % Elongation | 3.0 | 2.5 | ASTM D 1708 |
| Tensile yield strength | 9,340 psi | 6,830 psi | ASTM D 1708 |
| Tensile Modulus | 479,000 psi | 389,000 psi | ASTM D 1708 |
| Bottle weight | 23.3 grams | | |
| Midwall thickness | 0.72 mm | | |
| Density | 1.351 g/cc | | |
| Average drop impact | 12.2' | | ASTM D 2463 |

EXAMPLE 2

A bottle having somewhat less orientation than the bottle produced in Example 1 was prepared in essentially the same manner except the first mold walls were maintained at 150° F., the second mold walls were maintained at 120° F., the third mold walls were at 48° F., a 6 second cycle time was used and the core rods were at 250° F. In this case the bottles broke after dropping approximately 8 feet.

I claim:

1. The method of forming an oriented polyethylene terephthalate container which comprises the steps of:
   1. injecting a polyethylene terephthalate composition into a first mold chamber defining a parison having an axis substantially defined by a core rod and perimeter defined by the wall of the mold;
   2. cooling the exterior wall of the polyethylene terephthalate parison to render the outer wall of the parison dimensionally stable;
   3. after the outer wall of the parison is dimensionally stable, transferring the parison, while disposed on the core rod, to a second mold chamber having on an average a tolerance of between 2.5 and 150% between the body of the parison and the wall of the second mold chamber, wherein the wall of the second chamber is at a higher temperature than the wall of the first chamber in contact with the parison tip;
   4. when the core rod is at no more than 265° F., injecting a gaseous fluid into the parison at a pressure of at least 10 psig to separate the body of the parison from the core rod and force the exterior wall of the body of the parison to assume the shape of the wall of the second chamber;
   5. transferring the parison, while the neck of the parison is disposed on the core rod, to a third chamber having on an average a tolerance of at least 50% between the body of the parison and the wall of the third chamber; and
   6. at the orientation temperature of the polyethylene terephthalate parison, injecting a gaseous fluid into the parison to force the exterior walls of the body of the parison to assume the shape of the wall of the third chamber and to orient the walls of the body of parison.

2. The method of claim 1, wherein the gaseous fluid in step 4 is at from about 40 to 120 psig.

3. The method of claim 1, wherein the parison formed in step 1 is test tube shaped and the parison walls are on an average from about 15 to 400 mils thick.

4. The method of claim 1, wherein the core rod in step 4 is at 100 to 200° F.

* * * * *